(12) United States Patent
Ramos et al.

(10) Patent No.: US 6,994,167 B2
(45) Date of Patent: Feb. 7, 2006

(54) METHOD AND SYSTEM FOR CEMENT LINING A WELLBORE

(75) Inventors: Rogerio Tadeu Ramos, Bethel, CT (US); Christian Besson, Moscow (RU); Andrew Hunt, Dorset (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 670 days.

(21) Appl. No.: 09/949,233

(22) Filed: Sep. 8, 2001

(65) Prior Publication Data

US 2004/0180793 A1  Sep. 16, 2004

(30) Foreign Application Priority Data

Sep. 9, 2000  (GB) .................................. 0022151

(51) Int. Cl.
*E21B 28/00* (2006.01)
*E21B 33/14* (2006.01)
*E21B 37/02* (2006.01)

(52) U.S. Cl. .................. 166/286; 166/173; 166/177.2; 166/177.6; 166/249; 166/250.1; 166/250.14

(58) Field of Classification Search ................ 166/285, 166/286, 288, 250.01, 253.1, 250.11, 250.14, 166/250.1, 66, 249, 170, 173, 177.1, 177.2, 166/177.4, 77.6, 177.7, 242.9, 297, 298, 166/55, 55.1, 55.2, 55.3, 177.6
See application file for complete search history.

(56) References Cited

U.S. PATENT DOCUMENTS

| | | | |
|---|---|---|---|
| 2,813,584 A * | 11/1957 | Teplitz ...................... 166/264 |
| 3,026,936 A * | 3/1962 | Teplitz ...................... 166/285 |
| 3,120,268 A * | 2/1964 | Caldwell .................... 166/100 |
| 3,245,472 A * | 4/1966 | Myron ....................... 166/100 |
| 3,468,386 A * | 9/1969 | Johnson ...................... 175/4.6 |
| 3,887,009 A * | 6/1975 | Miller et al. ............... 166/292 |
| 3,924,677 A * | 12/1975 | Prenner et al. ............. 166/100 |
| 4,325,291 A * | 4/1982 | Paynton et al. ............. 454/14 |
| 4,407,365 A * | 10/1983 | Cooke, Jr. ................. 166/249 |
| 4,537,918 A * | 8/1985 | Parcevaux et al. .......... 523/130 |
| 4,775,009 A * | 10/1988 | Wittrisch et al. ........ 166/250.11 |
| 5,036,916 A * | 8/1991 | Bennett .................... 166/253.1 |
| 5,224,556 A * | 7/1993 | Wilson et al. ............. 175/4.53 |
| 5,529,123 A * | 6/1996 | Carpenter et al. ......... 166/293 |
| 5,829,520 A * | 11/1998 | Johnson ................. 166/250.01 |
| 6,131,658 A * | 10/2000 | Minear ................... 166/250.01 |
| 6,171,386 B1 * | 1/2001 | Sabins ...................... 106/724 |
| 2003/0150263 A1 * | 8/2003 | Economides et al. .... 73/152.48 |
| 2003/0226662 A1 * | 12/2003 | Linyaev et al. ......... 166/250.11 |
| 2004/0211564 A1 * | 10/2004 | Brothers et al. ............ 166/293 |
| 2004/0216872 A1 * | 11/2004 | Foster et al. ........... 166/250.01 |

FOREIGN PATENT DOCUMENTS

| GB | 2 185 574 A | 1/1987 |
|---|---|---|
| GB | 2 284 626 A | 11/1994 |
| WO | WO 97/37103 | 3/1997 |

* cited by examiner

*Primary Examiner*—Jennifer H Gay
(74) *Attorney, Agent, or Firm*—Jody Lynn DeStefanis; William L. Wang; Dale Gaudier

(57) ABSTRACT

The invention describes a method of cement lining a wellbore to enable a fixed sensor internal of the lining to sense characteristics of the external formations surrounding the wellbore using, at the region of the sensor position, a permeability changing device before completion of setting of the cement to create, in use, a permanent fluid communication through the cement lining between the external formation and the sensor.

26 Claims, 3 Drawing Sheets

METHOD AND SYSTEM FOR CEMENT LINING A WELLBORE

FIELD OF THE INVENTION

This invention relates to a method of cement lining a wellbore and also to a system for performing such method.

BACKGROUND TO THE INVENTION

In operation of a wellbore, it is a known practice to provide one or more fixed sensors inside the cement lining for acquiring data related to conditions in and characteristics of ground formations surrounding the wellbore. In order to enable fluid connection between the surrounding formation and a fixed sensor internal of the cement lining, it is known to perforate the cement lining after the cement has set, for example using small explosive charges.

An aim of the present invention is to provide an alternative and improved method of providing fluid pressure communication between the external formation and a fixed sensor inside the lining.

SUMMARY OF THE INVENTION

According to one embodiment of the invention, a method of cement lining a wellbore if provided to enable a fixed sensor internal of the lining to sense characteristics of the external formations surrounding the wellbore. At the region of the sensor position, means are utilised before completion of setting of the cement to create, in use, a permanent fluid pressure connection through the cement lining between the external formation and the sensor.

The invention may be practised in various ways.

According to a first embodiment, a cement curing retarder is introduced into the cement slurry in the region of the sensor totally to prevent curing of the cement in that region. In use, the region of uncured cement then provides fluid communication between the formation and the sensor.

Examples of suitable retarders include substances the molecules of which contain a substantial number of —OH groups and high temperature retarders from the family of organophosphate chelating agents. It is important to select a retarder which will not hydrolise during the period over which the sensor is to be used (i.e. over which readings are to be taken from the sensor), which may be several years.

According to a second embodiment, a system is used to increase the permeability of the cement in the region of the sensor, typically by the introduction of gas bubbles into the cement before it has set. The increased porosity of the cement due to the presence of the gas bubbles then provides fluid communication between the formation and the sensor in use.

A suitable system for inducing gas bubbles includes the installation of a small gas container, preferably pressurised, adjacent the sensor and release of the gas by opening a valve, by triggering a small explosive charge, or by chemical reaction if the gas is stored in the container in liquid or solid state. A preferred gas is carbon dioxide, which will slowly react with the cement, leaving interstices in the cement which will become occupied by water, oil or other liquid.

According to a third embodiment, a method is provided to induce cracks in the cement during curing.

Three preferred ways of inducing cracks are firstly the use of a sonic transducer, such as a solenoid or piezo-electric device, to create shear waves in the cement during curing, in the region of the sensor; secondly the addition to the cement during curing, locally to the sensor, of a substance which changes the coefficient of expansion of the cement, additives which are able to increase the rate of expansion of the cement to create cracks being magnesium and aluminium salts, and thirdly the use of bristles, especially metal bristles, attached to the sensor to link the sensor with the external formation.

The curing of the cement is an exothermal reaction, and the bristles induce local cracking by presenting a different rate of expansion as the cement cools down. It is possible to use bristles made of dissimilar metals, which give rise to electrolysis in the cement slurry as it sets, resulting in gas production which promotes the opening of channels in the cement in order to facilitate fluid communication between the formation and the sensor.

According to another embodiment of the invention, there is provided a section of wellbore casing having fixed thereto a sensor and means operative when the wellbore casing is being cement lined for inducing cracks in the cement slurry, as it is setting, in use to enable fluid pressure connection between the sensor and the external ground formation.

The means for inducing cracks in the cement lining may be means for performing any one of the aforedescribed methods.

Although the cement can become solid before it has fully set or cured, as used herein, the completion of the curing or setting process of the cement means the time when the cement reaches its final shear strength. In other words, at a time when the cement has reached its full hardness. In some cases it can take many days or even weeks for the cement to completely cure or set.

BRIEF DESCRIPTION OF THE DRAWINGS

In the accompanying drawings, according to embodiments of the invention.

DETAILED DESCRIPTION OF THE INVENTION

Figure 1:
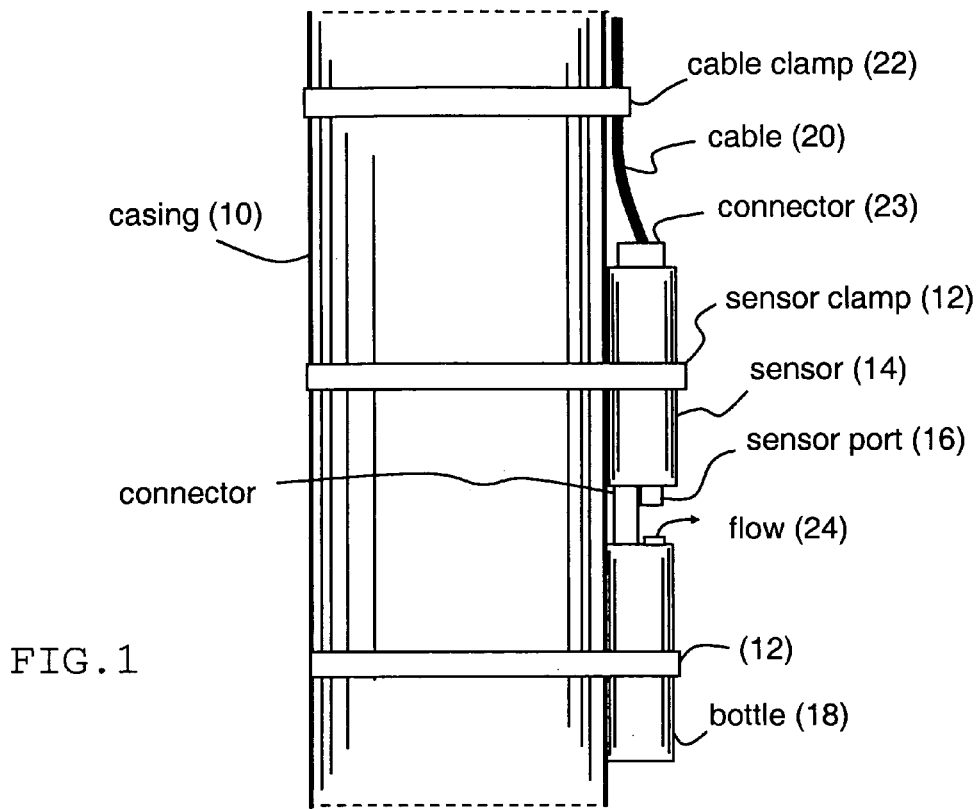
FIG. 1 shows a section of wellbore casing having fixed thereto a sensor and means for injecting fluid into the cement slurry when the casing has been lowered into the wellbore, and the wellbore is being cement lined.

Referring to FIG. 1, a section of wellbore casing 10 has fixed thereto by clamps 12 a sensor 14 having a sensor port 16 and adjacent thereto a container 18 filled with a substance, generally a fluid possibly under pressure, to be expelled adjacent the sensor. A sensor cable 20, fixed by clamps 22 to the wellbore casing and, in use, for conveying data from the sensor via a connector 23 to the surface, may also be used to cause the substance to be expelled at 24 from the container 18 at the appropriate time, for example by transmitting a signal to open a valve or to trigger a small explosive charge or to activate a motor-driven piston or a spring-loaded plunger.

After the casing has been installed in the wellbore, and is being cement lined, the substance is expelled from the container 18 into the cement slurry adjacent the sensor 14, as the cement is curing, to treat the cement so that fluid pressure communication is enabled between the sensor and the external ground formation in use.

The container 18 may house a substance more especially but not exclusively a fluid, of any one of several different types.

One option is a substance which will prevent the cement from curing at all locally to the sensor. Examples of such substances, among the many available, are sucrose, mannitol and catechol, but in all cases the particular curing retarder selected should be one which will prevent the cement from curing, locally to the sensor, for the period over which the sensor is to be used (i.e. over which readings from the sensor are to be taken).

Another option for the substance which is to be expelled from the container is a pressurised gas which will locally increase the permeability of the cement by creating bubbles therein. An inert gas such as nitrogen may be used, or a gas such as carbon dioxide which will slowly react with the cement to leave interstices in the cement which will fill with water, oil or other liquid.

Instead of storing the gas in the container under pressure, it could be stored in a liquid or solid state, and it could be released by chemical reaction, as for example by use of a small explosive charge locally to increase the porosity of the cement.

Still another option is to release from the container 18 a substance in the form of a cement additive which locally increases its rate of expansion, whereby to create cracks in the cement as it cures. Examples of such additives are magnesium, magnesium hydroxide, aluminium dioxide and calcium aluminite.

Figure 2:
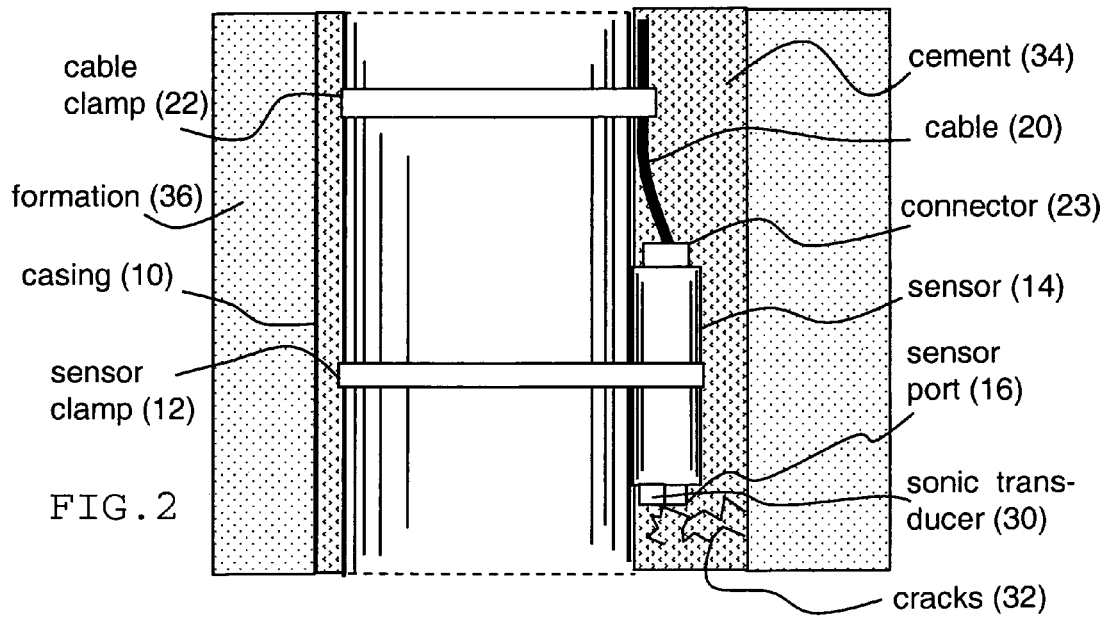
FIG. 2 shows a section of wellbore casing within a wellbore, having fixed thereto a sensor and means for transmitting shock waves into the cement slurry to create local cracking.

FIG. 2, which uses similar reference numerals to FIG. 1 for similar parts, shows another method of inducing cracks in the cement as it is curing. In this method, the sensor 14 has associated with it a sonic transducer 30, such as a piezo-electric or solenoid device, which can be triggered, again preferably by a signal transmitted down the sensor data cable 20, to induce pressure or shear waves in the cement slurry, locally to the sensor, as the cement is curing. The pressure or shear waves cause the creation of cracks 32 in the cement 34, which, in use, provide fluid pressure communication through the cement lining between the sensor 14 and the external ground formation 36.

Figure 3:
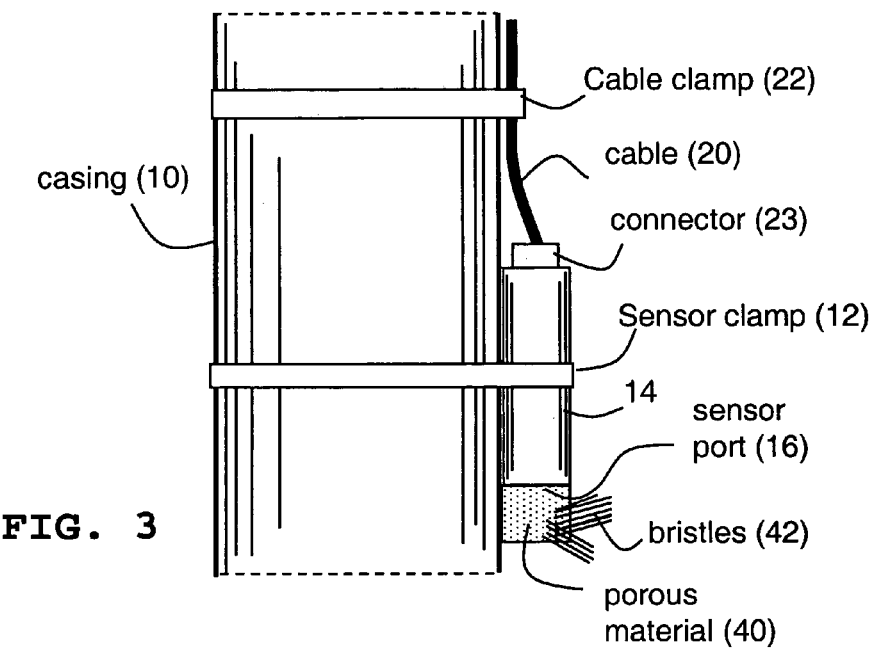
FIG. 3 is an elevational view.
Figure 4:
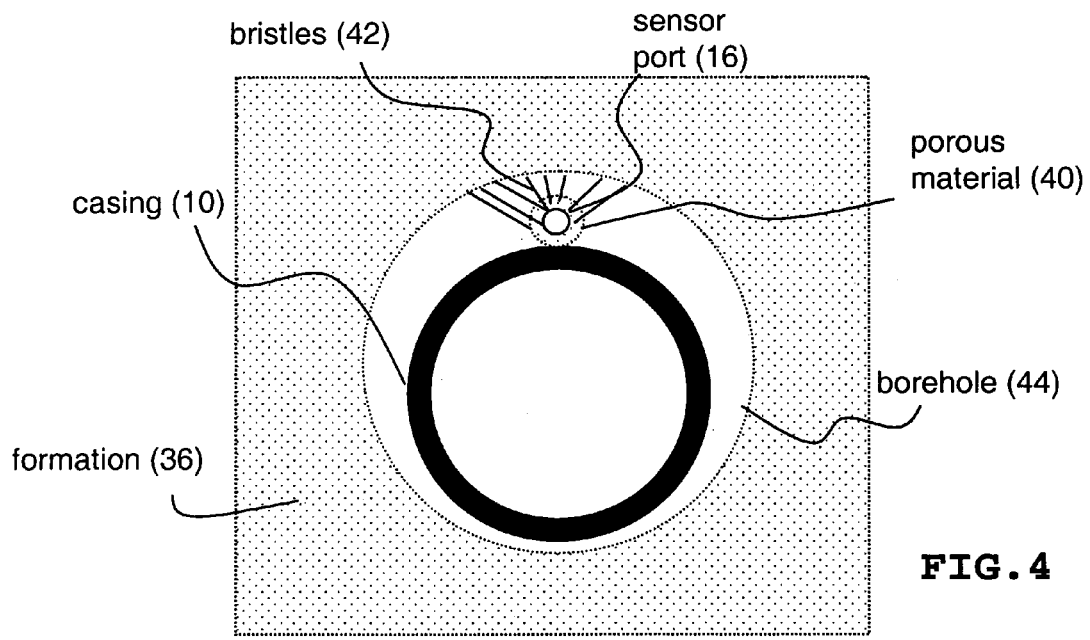
FIG. 4 is a plan view of a section of wellbore casing having fixed thereto a sensor and bristle means for inducing local cracks in the cement lining.

FIGS. 3 and 4, again using similar reference numerals for similar parts, show still another method of inducing cracks in the cement, locally to the sensor 14, as the cement cures. In this method the sensor is associated with a small mass 40 of porous material from which project bristles 42, preferably metallic bristles. FIG. 3 shows the section of casing carrying the sensor and the bristles, before it is installed in the wellbore. FIG. 4 shows the casing section in the installed condition. It can be seen that the bristles 42 provide a link between the sensor 14 and the external ground formation 36 around the wellbore 44. As the curing of the cement is an exothermal reaction, the temperature of the cement slurry rises during setting whereby the bristles 42 create an expansion differential as the cement subsequently cools. This induces the formation of local micro-cracks in the cement and, in use, provides fluid pressure communication between the sensor 14 and the external ground formation 36.

Figure 5:
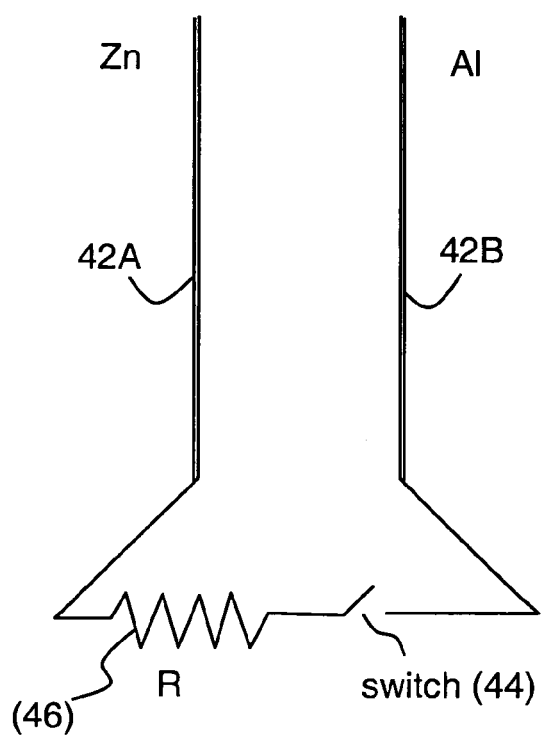
FIG. 5 is a diagram to aid understanding of one possible feature of the bristle means of FIGS. 3 and 4.

Referring to FIG. 5, if the bristles are made of two dissimilar metals, some 42A made of zinc and some 42B made of aluminium for example, the cement slurry can act as an electrolite, promoting corrosion of the annode (zinc) and the production of hydrogen at the cathode (aluminium). Both the corrosion and the gas generation assist the opening of channels in the cement which, in use, provide fluid pressure communication between the sensor and the external ground formation. A switch 44 can be used to start and stop the reaction and a resistor 46 to control the speed of the reaction. The switch 44 is preferably not closed until the cement lining is being installed. The pH value of the cement slurry affects the speed of reaction, and the resistor 46 can be used to optimise the speed of reaction for a given value of the pH of the cement.

Various electrochemical couples are able to achieve forced metal corrosion, including Pb—Al, Ag—Ni, Zn—Mg, Cu—Mg, H2-Ag, H2-Al, H2-Mg, O2-Pb, O2-Ni and O2-Zi.

In FIGS. 1 to 3, the cable which transmits data from the sensor to the surface during use is shown clamped to the outside of the wellbore casing.

The above-described embodiments are illustrative of the invention only and are not intended to limit the scope of the present invention.

What is claimed is:

1. A method of providing a permanent fluid communication through cement lining of a well bore between an external formation and a fixed sensor internal of the lining to sense characteristics of the external formations surrounding the wellbore, comprising the step of creating at the region of the sensor position a permanent fluid communication through the cement lining between the external formation and the sensor by modifying the permeability of the cement lining by activating a permeability changing device installed on wellbore casing adjacent to the sensor and increasing the permeability locally in the region of the sensor position, in which a cement curing retarder is introduced into the cement slurry in the region of the sensor to prevent curing of the cement in the region thereby providing the fluid communication between the formation and the sensor.

2. A method according to claim 1, in which the retarder comprises molecules that contain —OH groups.

3. A method according to claim 1, in which the retarder comprises a high temperature retarder from the family of organophosphate chelating agents.

4. A method of providing a permanent fluid communication through cement lining of a well bore between an external formation and a fixed sensor internal of the lining to sense characteristics of the external formations surrounding the wellbore, comprising the step of creating at the region of the sensor position a permanent fluid communication through the cement lining between the external formation and the sensor by modifying the permeability of the cement lining by activating a permeability changing device installed on wellbore casing adjacent to the sensor and increasing the permeability locally in the region of the sensor position, in which permeability is increased by the introduction of gas bubbles into the cement before setting.

5. A method according to claim 4, in which gas bubbles are introduced by releasing gas from a gas container adjacent the sensor.

6. A method according to claim 5, in which the gas is released by opening a valve, by triggering a small explosive charge, or by chemical reaction.

7. A method according to any of claims 4 to 6, in which the gas is carbon dioxide.

8. A method of providing a permanent fluid communication through cement lining of a well bore between an external formation and a fixed sensor internal of the lining to sense characteristics of the external formations surrounding the wellbore, comprising the step of creating at the region of the sensor position a permanent fluid communication through the cement lining between the external formation and the sensor by modifying the permeability of the cement lining by activating a permeability changing device installed on wellbore casing adjacent to the sensor and increasing the permeability locally in the region of the sensor position, in which said fluid communication is created by inducing cracks in the cement and said cracks are induced using a sonic transducer to create pressure shear waves in the cement in the region of the sensor.

9. A method of providing a permanent fluid communication through cement lining of a well bore between an external formation and a fixed sensor internal of the lining to sense characteristics of the external formations surrounding the wellbore, comprising the step of creating at the region of the sensor position a permanent fluid communication through the cement lining between the external formation and the sensor by modifying the permeability of the cement lining by activating a permeability changing device installed on wellbore casing adjacent to the sensor and increasing the permeability locally in the region of the sensor position, in which said fluid communication is created by inducing cracks in the cement and the cracks are induced by adding to the cement during curing, locally to the sensor, a substance which changes the coefficient of expansion of the cement.

10. A method according to claim 9, in which said substance comprises magnesium and aluminium salts.

11. A method of providing a permanent fluid communication through cement lining of a well bore between an external formation and a fixed sensor internal of the lining to sense characteristics of the external formations surrounding the wellbore, comprising the step of creating at the region of the sensor position a permanent fluid communication through the cement lining between the external formation and the sensor by modifying the permeability of the cement lining by activating a permeability changing device installed on wellbore casing adjacent to the sensor and increasing the permeability locally in the region of the sensor position, in which said fluid communication is created by inducing cracks in the cement and said cracks are induced by bristles attached to the sensor to link the sensor with the external formation, the bristles inducing local cracking by presenting a different rate of expansion as the cement cools down.

12. A method of providing a permanent fluid communication through cement lining of a well bore between an external formation and a fixed sensor internal of the lining to sense characteristics of the external formations surrounding the wellbore, comprising the step of creating at the region of the sensor position a permanent fluid communication through the cement lining between the external formation and the sensor by modifying the permeability of the cement lining by activating a permeability changing device installed on wellbore casing adjacent to the sensor and increasing the permeability locally in the region of the sensor position, in which said fluid communication is created by bristles made of dissimilar metals giving rise to electrolysis.

13. An apparatus for enabling in a cement lined wellbore a fixed sensor internal of the lining to sense characteristics of the external formations surrounding the wellbore, the apparatus comprising a device adjacent to the sensor and adapted to create locally at the region of the sensor position a permanent fluid connection through the cement lining between the external formation and the sensor, in which the device comprises a cement curing retarder adapted to introduce into the uncured cement in the region of the sensor to prevent complete curing of the cement in that region, wherein the region of uncured cement provides the fluid pressure communication between the formation and the sensor.

14. An apparatus according to claim 13, in which the retarder comprises molecules that contain —OH groups.

15. An apparatus according to claim 13, in which the retarder comprises a high temperature retarder from the family of organophosphate chelating agents.

16. An apparatus for enabling in a cement lined wellbore a fixed sensor internal of the lining to sense characteristics of the external formations surrounding the wellbore, the apparatus comprising a device adjacent to the sensor and adapted to create locally at the region of the sensor position a permanent fluid connection through the cement lining between the external formation and the sensor, in which the device is adapted to increase the permeability of the cement in the region of the sensor by introducing gas bubbles into the cement before complete setting, thereby increasing the porosity of the cement due to the presence of the gas bubbles providing fluid pressure communication between the formation and the sensor in use.

17. An apparatus according to claim 16, in which the device comprises a gas container to release gas bubbles into the uncured cement adjacent the sensor.

18. An apparatus according to claim 17, in which the device further comprises a valve that when opened releases the gas.

19. An apparatus according to claim 17 in which the device further comprises a small explosive charge that when triggered releases the gas.

20. An apparatus according to claim 17 in which the gas is released by chemical reaction and the gas is stored in the container in liquid or solid state.

21. An apparatus according to claim 16, in which the gas is carbon dioxide.

22. An apparatus for enabling in a cement lined wellbore a fixed sensor internal of the lining to sense characteristics of the external formations surrounding the wellbore, the apparatus comprising a device adjacent to the sensor and adapted to create locally at the region of the sensor position a permanent fluid connection through the cement lining between the external formation and the sensor by inducing cracks in the cement, in which the device comprises a sonic transducer to induce cracks by creating pressure shear waves in the cement in the region of the sensor.

23. An apparatus for enabling in a cement lined wellbore a fixed sensor internal of the lining to sense characteristics of the external formations surrounding the wellbore, the apparatus comprising a device adjacent to the sensor and adapted to create locally at the region of the sensor position a permanent fluid connection through the cement lining between the external formation and the sensor by inducing cracks in the cement, in which the cracks are induced by adding to the cement, locally to the sensor, a substance which changes the coefficient of expansion of the cement.

24. An apparatus according to claim 23, in which said substance comprises magnesium and aluminium salts.

25. An apparatus for enabling in a cement lined wellbore a fixed sensor internal of the lining to sense characteristics of the external formations surrounding the wellbore, the apparatus comprising a device adjacent to the sensor and adapted to create locally at the region of the sensor position a permanent fluid connection through the cement lining between the external formation and the sensor by inducing cracks in the cement, in which the device comprises bristles attached to the sensor to link the sensor with the external formation, the bristles inducing locally to the sensor cracking by presenting a different rate of expansion as the cement cools down.

26. An apparatus for enabling in a cement lined wellbore a fixed sensor internal of the lining to sense characteristics of the external formations surrounding the wellbore, the apparatus comprising a device adjacent to the sensor and adapted to create locally at the region of the sensor position a permanent fluid connection through the cement lining between the external formation and the sensor, in which the devices comprises a plurality of bristles made of dissimilar metals, which give rise to electrolysis in the cement slurry during setting, resulting in gas production which promotes the opening of channels in the cement in order to facilitate fluid communication between the formation and the sensor.

* * * * *